Nov. 18, 1941.   C. C. FULTON   2,263,081
POWER SOURCE SUPPORT FOR BICYCLE FRAMES
Filed Feb. 20, 1939
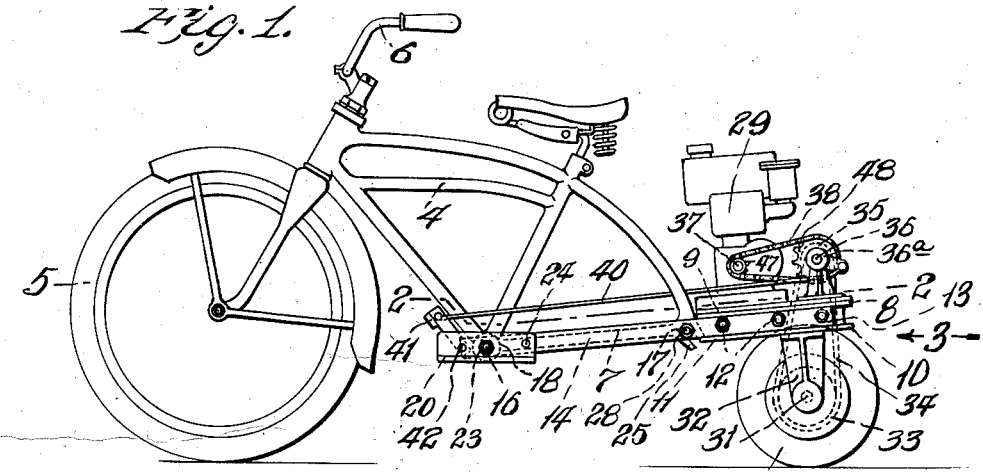
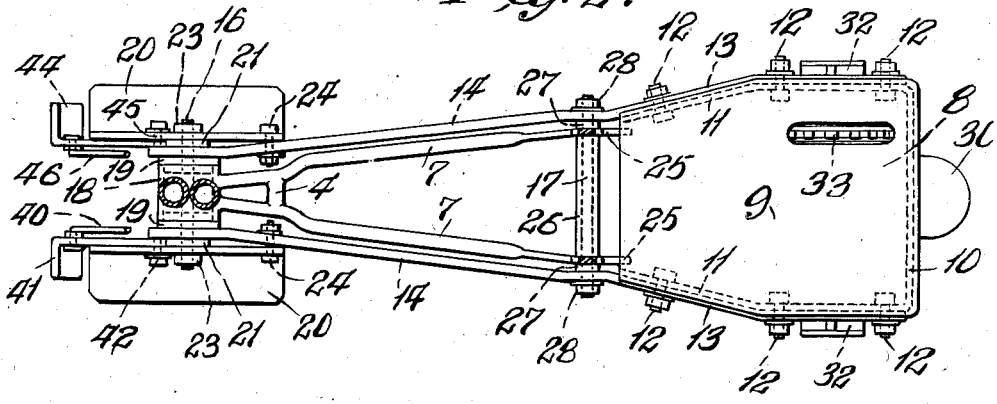
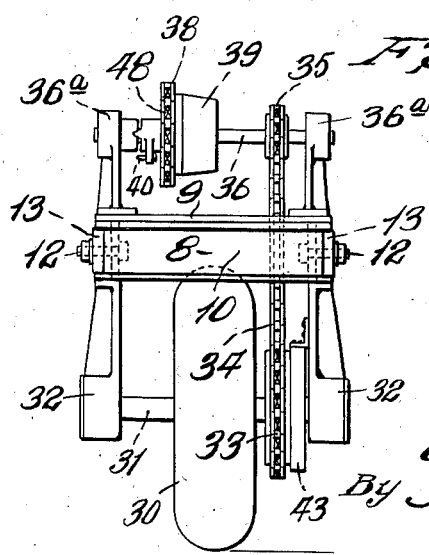
Inventor:
Claude C. Fulton
By Herbert G. Fletcher
Atty.

Patented Nov. 18, 1941

2,263,081

UNITED STATES PATENT OFFICE 2,263,081

POWER SOURCE SUPPORT FOR BICYCLE FRAMES

Claude C. Fulton, St. Louis, Mo., assignor to Fulton Mower and Manufacturing Co., St. Louis, Mo., a corporation of Missouri Application February 20, 1939, Serial No. 257,305

9 Claims. (Cl. 180—11)

This invention relates to a power source support for a bicycle frame for adapting the bicycle to be power propelled, such as by an engine or the like mounted on the support, and being geared to the traction wheel of the support.

Another object of the invention is to provide a support for a bicycle frame of a construction which is capable of sustaining the rear end of the frame.

A further object is to provide a support having paralleling parts for attaching it to like parts of a bicycle frame.

Still another object is to provide a support for the rear end of a bicycle frame with features for attaching cooperation with certain bearing supports of the frame for sustaining the support in longitudinal alinement with the frame rearwardly thereof.

Another still further object is to provide an engine support for the rear end of a bicycle frame with parts paralleling portions of the frame and secured in paralleling relation thereto.

It is also an object of the invention to provide a bicycle with a support secured to the rear end of the frame thereof in a specific manner, and in lieu of the pedal-driven wheel of the bicycle.

Other objects and advantages will appear as this description progresses and by reference to the drawing, in which:

Figure 1 is a side elevation of a bicycle having this improved power source support applied thereto.

Figure 2 is an enlarged fragmentary horizontal sectional view taken approximately on the line 2—2 of Fig. 1.

Figure 3 is an enlarged end elevation of Fig. 1 taken in the direction of the arrow 3 in said figure.

Referring by numerals to the several figures of the drawing, 4 designates a bicycle frame which may be of customary design and having the front steering wheel 5 controlled from the handle bars 6, and extending rearwardly and forming part of the frame 4 are the horizontally inclining bifurcating parts 7 between which the traction wheel (not shown) of the bicycle is usually supported, and it is by removal of the heretofore mentioned traction wheel of the bicycle which makes this invention applicable to the bicycle frame by providing a power source support 8 in securance to the bicycle frame, in a specific manner and as shown.

The support 8 comprises a platform 9 and a pre-shaped channel member 10 on which the platform is securely fixed and secured to the side portions 11 of the channel member 10, such as by bolts 12, are the rear ends of respective arms 13, each arm 13 having a portion 14 paralleling a respective member 7 and being secured in paralleling relation to the member 7 by the studs 16 and 17.

The stud 16 is passed through the bearing box 18 heretofore used for supporting the axis or pedal crank of the driver for the traction bicycle wheel, said stud 16 being supported in the bearing box 18 by being concentrically mounted in a pair of shouldered end plates 19 which are engaged against respective ends of the bearing box, and mounted on said stud outwardly of respective end plates 19 are the forward ends of the arms 13, as shown more clearly in Fig. 2.

Mounted on each end of the stud 16 is a foot rest 20 and disposed on the stud 16 between respective foot rests and arms 13, is a washer 21, and for securing the forward ends of the arms 13, the end plates 19 and foot rests 20 in clamped relation, respective nuts 23 are securely drawn on the threaded ends of the stud 16. The foot rests 20 are further secured to the arms 13 by end disposed bolts 24 which are mounted through portions of the foot rests and the arms 13.

The arms 13 are further secured to the bicycle frame 4 by the stud 17 being mounted in the jaw 25 of each frame part or member 7, said stud 17 being passed through a spacer sleeve 26 which is disposed between the jaws 25 and through washers 27 which are disposed between respective arms 13 and jaws 25, and the parts 25, 26 and 27 are secured in clamped relation on the stud 17 by the nuts 28, one of which is mounted on each threaded end of the stud 17.

The platform 9 is for the support of a power source or engine 29 which is secured on the platform for cooperation with the traction wheel 30 which is securely fixed on a shaft 31, said shaft being supported at its ends in respective bearings 32 which are secured to and depend from respective side portions 11 of the channel member 10, and securely fixed on the shaft 31 is a sprocket 33 and cooperable with said sprocket is a chain belt 34 which cooperates with the sprocket 35 on the combined clutch and transmission shaft 36 which is chain driven from the engine shaft 37 by the chain belt 38 and cooperable sprockets 47 and 48.

The shaft 36 is supported in bearings 36a.

For cooperation with the clutch 39 on the shaft 36 is a pull rod 40 which is connected to a foot lever 41 pivoted at 42 to one of the foot rests 20, and for cooperation with the brake 43 on the shaft 31 is a foot lever 44 which is pivoted at 45 to the right hand foot rest 20, and for connecting the foot lever 44 and an operating part of the brake 43 is a pull rod 46.

When a bicycle frame having a front steering wheel and controlling handle bars is equipped with this improved power source support 8 and power is supplied to the traction wheel 30 by the power source or engine 29, and the traction wheel 30 is positioned to track with the longitudinal center of the bicycle frame 4, it is obvious that a simplified motorized bicycle is provided, the simplification of which being brought about by the specific features of attaching the power source support 8 to the bicycle frame by the arms 13 of the support having respective portions 14 paralleling respective parts 7 of the bicycle frame and secured to the frame in the manner as described.

Having thus described the invention so that those skilled in the art will be able to practice the same, what I desire to secure by Letters Patent is defined in what is claimed, it being understood that various changes in the device shown and described in detail and not amounting to invention, may be made without departing from the spirit and scope of my invention.

What I claim is:

1. A bicycle frame having a steering wheel, a crank bearing box and rear wheel supports forming a part of said frame, an engine base disposed rearwardly of and beyond said frame and having a pair of arms secured to said frame through the crank bearing box and the rear wheel supports, a traction wheel supported from said base, and an engine mounted on said base and having cooperation with said traction wheel.

2. A bicycle frame having a pair of spaced horizontally and rearwardly extending parts, a crank bearing box adjacent one end of said parts and a rear wheel support at the opposite end of each of said parts, an engine base disposed rearwardly of and beyond said frame and having a pair of arms each paralleling a respective horizontally and rearwardly extending part its entire length and directly secured to the frame through the crank bearing box and the rear wheel supports, a traction wheel supported by said base, and an engine mounted on said base and having cooperation with said traction wheel.

3. A power source support for a customary bicycle frame having a crank bearing box and a pair of rear wheel supports and comprising a pair of arms extending rearwardly beyond said frame, each arm paralleling a respective part of the frame the entire length of said parts and being directly secured to the frame through the crank bearing box and the rear wheel supports of the frame, respectively.

4. A power source support for a customary bicycle frame having a crank bearing box and a pair of rear wheel supports and comprising a pair of arms extending rearwardly beyond said frame, each arm paralleling a respective part of the frame the entire length of said parts, and respective studs mounted in the crank bearing box and the rear wheel supports of the frame for securing said arms to the frame.

5. A customary bicycle frame having rearwardly extending bifurcating parts, a support having arms paralleling respective bifurcating parts their entire length, each bifurcating part having a jaw on its extending end and a crank bearing box adjacent their inner ends, a stud respectively mounted in said jaws and said bearing box and secured at their ends to said arms, a traction wheel beneath said support and rotatably secured thereto, and a power source mounted on said support and having cooperable connection with said traction wheel.

6. A customary bicycle frame having a steering wheel and rearwardly extending bifurcating parts, a support having arms paralleling respective bifurcating parts their entire length, each bifurcating part having a jaw on its extending end and a crank bearing box adjacent their inner ends, a stud respectively mounted in said jaws and said bearing box and secured at their ends to said arms, a traction wheel beneath said support and rotatably secured thereto, and a power source mounted on said support and having cooperable connection with said traction wheel, said steering wheel and said traction wheel being the only means of support for the bicycle frame.

7. An engine support for the rear end of a customary bicycle frame having a crank bearing box and rear wheel supports and comprising a pair of arms extending rearwardly from the crank bearing box of the frame, and studs for securing said arms to the frame, respectively mounted through the crank bearing box and the rear wheel supports of the frame.

8. An engine support for the rear end of a customary bicycle frame having a crank bearing box and rear wheel supports and comprising a pair of arms extending rearwardly from the crank bearing box of the frame, studs for securing said arms to the frame, respectively mounted through the crank bearing box and the rear wheel supports of the frame, and shouldered plates mounted in the ends of the crank bearing box for the support of the stud therein.

9. An engine support for the rear end of a customary bicycle frame having a crank bearing box and rear wheel supports and comprising a pair of arms extending rearwardly from the crank bearing box of the frame, studs for securing said arms to the frame, respectively mounted through the crank bearing box and the rear wheel supports of the frame, and a foot rest mounted on respective ends of the stud of the crank bearing box.

CLAUDE C. FULTON.